United States Patent [19]

Grant

[11] 4,439,938
[45] Apr. 3, 1984

[54] COUPLING MECHANISM

[75] Inventor: David Grant, Newcastle upon Tyne, England

[73] Assignee: Envirotech Corporation, Salt Lake City, Utah

[21] Appl. No.: 549,213

[22] Filed: Nov. 4, 1983

Related U.S. Application Data

[63] Continuation of Ser. No. 321,785, Nov. 16, 1981, abandoned.

[30] Foreign Application Priority Data

Nov. 17, 1980 [GB] United Kingdom ................. 8036826
Feb. 6, 1981 [GB] United Kingdom ................. 8103779

[51] Int. Cl.³ .............................................. E02F 3/76
[52] U.S. Cl. ................................... 37/117.5; 414/723; 172/272
[58] Field of Search ....................... 37/117.5, 118, 231; 414/686, 723; 172/272, 275; 280/479, 479 A, 508-510

[56] References Cited

U.S. PATENT DOCUMENTS

| | | | |
|---|---|---|---|
| 2,447,150 | 8/1948 | Anderson | 37/117.5 |
| 3,412,489 | 11/1968 | Klapprodt et al. | 172/272 X |
| 3,606,052 | 9/1971 | Schurz | 414/723 |
| 3,887,096 | 6/1975 | Wieland | 37/117.5 |
| 3,985,249 | 10/1976 | Aker et al. | 414/723 |
| 4,013,182 | 3/1977 | Pratt et al. | 172/272 X |
| 4,106,645 | 8/1978 | Janish | 414/723 |
| 4,203,238 | 5/1980 | Bangert et al. | 37/118 R |
| 4,214,840 | 7/1980 | Beales | 37/118 R |
| 4,253,793 | 3/1981 | Braml | 414/723 |
| 4,311,428 | 1/1982 | Arnold | 414/723 |

Primary Examiner—S. H. Eickholt
Attorney, Agent, or Firm—Robert E. Krebs

[57] ABSTRACT

A coupling system includes a connecting assembly 4 having two upwardly facing critically angled U-shaped lifting forks mounted at the upper ends of its sides. A bucket 2 has two transversely spaced locating members 6 and 8 defining a central profiled portion 10. Two co-linear transverse pins 12 are mounted at the top of the portion 10, and a central recess 18 is formed in the profiled portion 10. An end member 22 having an aperture 24 therein is located at the base of the recess 18. A latch bar 34 and an operating cylinder 36 are mounted on the assembly 4, and are dimensioned to fit in the recess 18.

In operation, the assembly 4 is tilted forwardly and advanced until the lifting pins 12 enter the forks 32. The assembly 4 is then tilted backwards and edged forwardly until the cylinder 36 and the latch bar 34 enter the recess 18. The cylinder 36 is then operated to advance the latch bar 34 into the aperture 24 to couple together the bucket 2 and the assembly 4.

To detach the bucket 2 the cylinder 36 is operated to retract the latch bar 34 from the aperture 24. The assembly 4 is tilted until the lower face of the bucket 2 swings out parallel to the ground, and the bucket 2 is then lowered until it rests on the ground. The assembly 4 is tilted forwardly and is reversed to withdraw the forks 32 from the pins 12.

8 Claims, 6 Drawing Figures

COUPLING MECHANISM

This application is a continuation of application Ser. No. 321,785, filed Nov. 16, 1981 now abandoned.

TECHNICAL FIELD

The present invention relates to a system for coupling together two members. The invention is particularly concerned with but not restricted to a system for coupling a loading or operating implement to a service vehicle.

In this specification the term "implement" is used broadly, and is intended to cover any implement or operating device suitable for loading, working or carrying such as for example a pick-up cradle, carrier, bucket, fork lift unit or drill unit etc. Similarly, the term "service vehicle" is also used broadly, and is intended to cover any type of vehicle suitable for operating, transporting and/or lifting the implement or operating device.

A coupling system of the invention may be used in connection with a service vehicle used in an underground or surface application. One technique used in mining coal, including metalliferous rocks, and minerals is to blast the face to fragment the material, and then to pick-up and move the fragmented pieces. One coupling system of the invention is designed to couple a bucket to the forward part of a suitable service vehicle. This vehicle is electrically hydraulically or pneumatically operable so as to raise or lower the bucket, and to pivot the bucket about a horizontal axis. In operation the bucket is lowered so that its lower face is parallel to and skimming the ground, and the vehicle is advanced towards the face causing the material fragments to enter the bucket. The bucket is then raised and tilted backwards to retain the contained material, and the vehicle is withdrawn from the face and moved to a suitable dumping region.

BACKGROUND ART

In a previously proposed service vehicle the bucket, drill unit or other operating device is connected to the vehicle to form a permanent part of the vehicle. The problem arises that a separate vehicle is required for each function. If the operating device is a bucket then the vehicle can only be operated with the bucket. If the operating device is a drill unit then the vehicle can only be operated with the drill unit.

It is known that various attaching systems have been produced and fitted to permanent booms on loader equipment. These have generally consisted of a means of connection which required the operator to leave his operating station either before or after the attaching or detaching operation to complete the process of attaching or detaching the implement. This means of connection would constitute a safety hazard under certain conditions.

There is also the requirements in most of the previous systems for a certain amount of machining to the existing boom on site to enable the carrying frame to be fitted. This requirement leads to inaccuracy and potentially hazardous operation of the machine due to lack of quality compared with say the quality control excercised in a manufacturers works.

Other features of the prior art are the lack of speed in connecting and detaching due to the necessity for close alignment of the mating parts; the use of pins to lock the units together which cannot provide a rigid connection due to the tolerances required, and also the difficulty in attaching and detaching on uneven ground.

STATEMENT OF INVENTION AND ADVANTAGES

It is an aim of the invention to alleviate the aforementioned problems, and accordingly there is provided a coupling system comprising a readily separable operating device and a support device having complementary rear and forward portions respectively, two transversely spaced upwardly facing critically angled U-shaped lifting forks located on the upper portion of the support device, one or more transverse lifting pins positioned on the upper region of the operating device and adapted for location in said forks to enable the devices to pivot through a range of movement in a plane and to bring said complementary portions into engagement to inhibit relative movement of the two devices transverse to said plane, and latching means automatically operable from a remote source to take up a latching condition to retain said connected devices with said complementary portions in engagement, or a release condition to allow detachment of the devices.

Said complementary rear and forward portions may each have two internal faces meeting at a transverse line which is located at the mid-region of the respective portion.

The operating device may have a central profiled portion to receive the support device, and the operating device may also have a central recess or profiled portion to receive the latching means.

In a preferred coupling system of the invention the latching means may comprise a latch bar mounted on the support device and operable for movement between a latching position in which it enters an aperture in an end member on the operating device, and a release position in which it is withdrawn from the aperture. Insertion of the latch bar into the aperture may also move the operating device and support device towards one another. One way of achieving this effect is for the latch bar to be wedge-shaped, and for the apeture face remote from the operating device to be inclined upwardly and outwardly.

The support device may be mounted on a service vehicle, and the latching means may be operable from the vehicle.

FIGURES IN THE DRAWINGS

An embodiment of the invention will now be described by way of example with reference to the accompanying illustrative drawings in which:

FIG. 1 is a perspective view of one member of the coupling system of the invention, FIG. 2 is a perspective view of the other member of the said coupling system of the invention, FIG. 3 is a side elevation of the said coupling system of the invention with the two members separated, FIG. 4 is a side elevation of the said coupling system of the invention with the two members attached and lifted, FIG. 5 is a perspective view of part of the one member of FIG. 1, and FIG. 6 is a perspective view of an alternative backplate of the one member of FIG. 1.

DETAILED DESCRIPTION OF DRAWINGS

Figure 1:
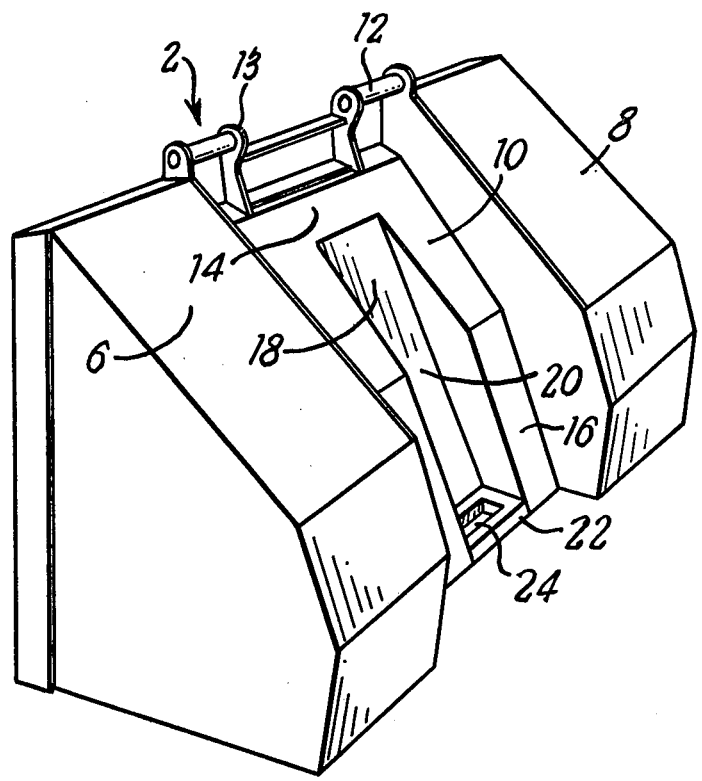
Figure 2:
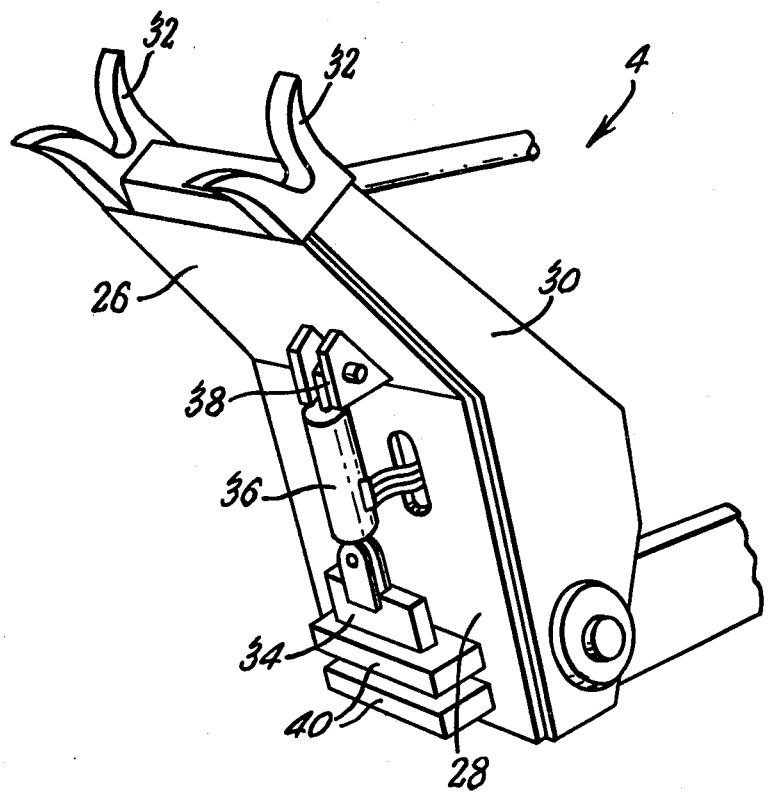
Figure 5:
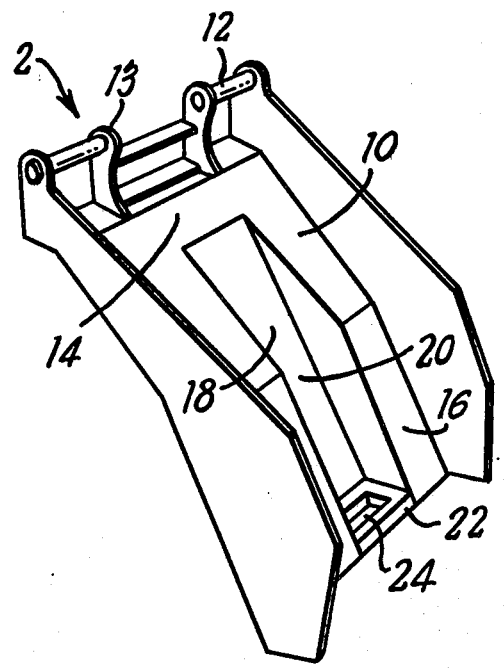

Referring particularly to FIGS. 1 and 2, a coupling system is used to attach a heavy duty bucket 2 to a connecting assembly 4. The coupling system is equally suitable for use with a container or other implement instead of the bucket 2. The bucket 2 is intended for duties such as scooping up earth, rubble rock mineral or coal in underground or surface applications. The bucket 2 is shaped to include two transversely spaced locating members 6 and 8 which extend rearwardly from the bucket to define a central profiled portion 10. Two horizontal co-linear lifting plus 12 extend towards one another from their respective mountings on the side plates of the locating members 6 and 8 to their inward support mounting plates 13. The central profiled portion 10 includes upper and lower faces 14 and 16 which are inclined to one another and which meet at a horizontal line in the mid-region of the profiled portion 10. A central recess 18, having a rear face 20 opposed side faces and lower face provided by a lower end member 22, is formed in the profiled portion 10. The rear face 20 is inclined from the face 14, and a rectangular aperture 24 extends through the lower end member 22. For clarity the central portion of the bucket rear is illustrated in FIG. 5.

The connecting assembly 4 is mounted on a service vehicle as will be hereinafter described, and includes two forwardly facing end plates 26 and 28 which are inclined to one another and meet at a horizontal line in the mid-region of the connecting assembly. These end plates 26 and 28 are secured to and extend between two side support plates 30, and two upwardly facing critically angled U-shaped lifting forks 32 are mounted at the upper ends of their respective side support plates 30.

A wedged shaped latch bar 34 is pivotally connected to a piston located in a hydraulically operable cylinder 36 which is also pivotally mounted on a bracket 38 secured to the end plate 26. Two spaced guide bars 40 are mounted on the end plate 28, and are set at strategic intervals suitable to matching the end member 22. These guide bars 40 each have an aperture which makes a sliding fit with the latch bar 34 to provide a guide path for the latch bar 34.

The bucket 2 and connecting assembly 4 are dimensioned and arranged so that the connecting assembly 4 can fit with the profiled portion 10 with the lifting pins 12 located in the lifting forks 32 and the end plates 26 and 28 in mating contact with the upper and lower faces 14 and 16 respectively. When the connecting assembly 4 sits in the bucket profiled portion 10, the cylinder 36, the latch bar 34 and the guide bars 40 are located in the central recess 18 with the lower guide bar 40 sitting on the lower end member 22. The cylinder 36 is hydraulically operable to move the latch bar 34 between a latching position in which the latch bar 34 extends into the aperture 24, and a release position in which the latch bar 34 is withdrawn from the aperture 24.

When the latch bar 34 is in the release position, the bucket 2 and the connecting assembly 4 can be readily separated by lowering the connecting assembly 4 to rest the bucket 2 on the ground, and then withdrawing the connecting assembly 4 from the bucket 2. When the latch bar is in the latching position, the bucket 2 is securely mounted on the connecting assembly 4, and the bucket 2 cannot move relative to the connecting assembly 4 irrespective of the position or inclination of the connecting assembly 4.

Referring to FIGS. 1 to 4 of the drawings, the connecting assembly 4 is mounted forwardly of a heavy duty service vehicle which can include an articulated extension 42 mounted for pivotal movement in a horizontal plane. The extension 42 includes a pair of transversely spaced forwardly extending side members 44 mounted on two road wheels 46 or tracks in the case of a crawler tracked vehicle. A pair of transversely spaced lifting arms 48 are mounted to the side members 44 by pivotal mountings 50 for pivotal movement in a vertical plane. A lifting piston 52 and cylinder 54 are connected to the lifting arms 48 and side members 44 by the mountings 56 and 58 respectively.

A double acting hydraulic tilting piston 60 and cylinder 62 are pivotally connected to the connecting assembly 4 and the extension 42 respectively by the mountings 64 and 66. The cylinders 54 and 62 are hydraulically operable, and the connecting assembly 4 is pivotally mounted on the lifting arms 48 by the mountings 68.

Figure 3:
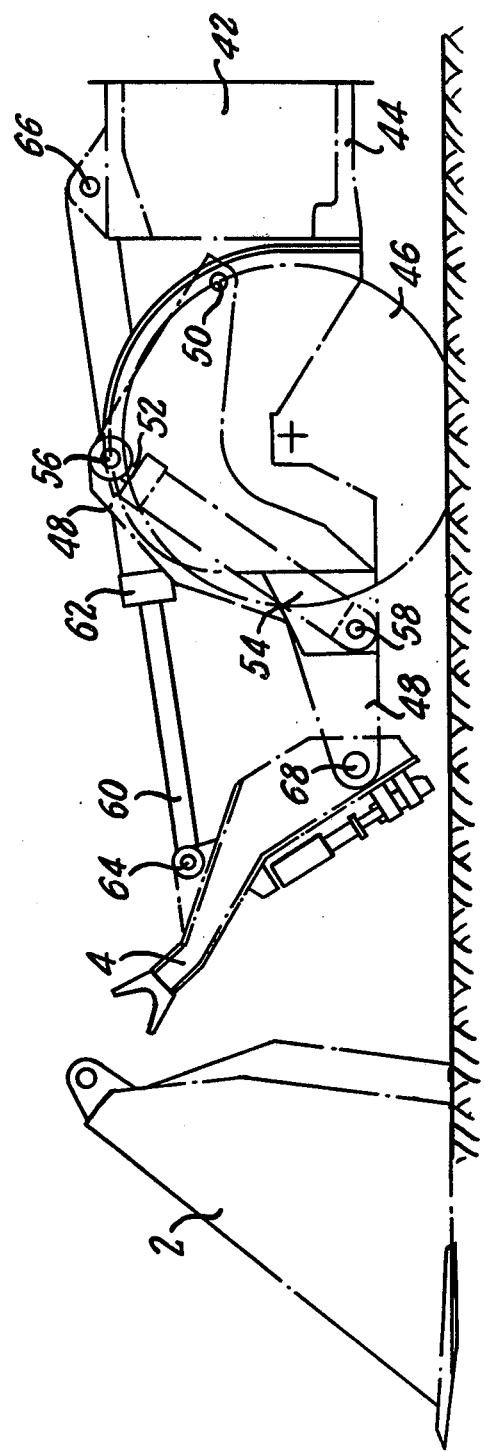
Figure 4:
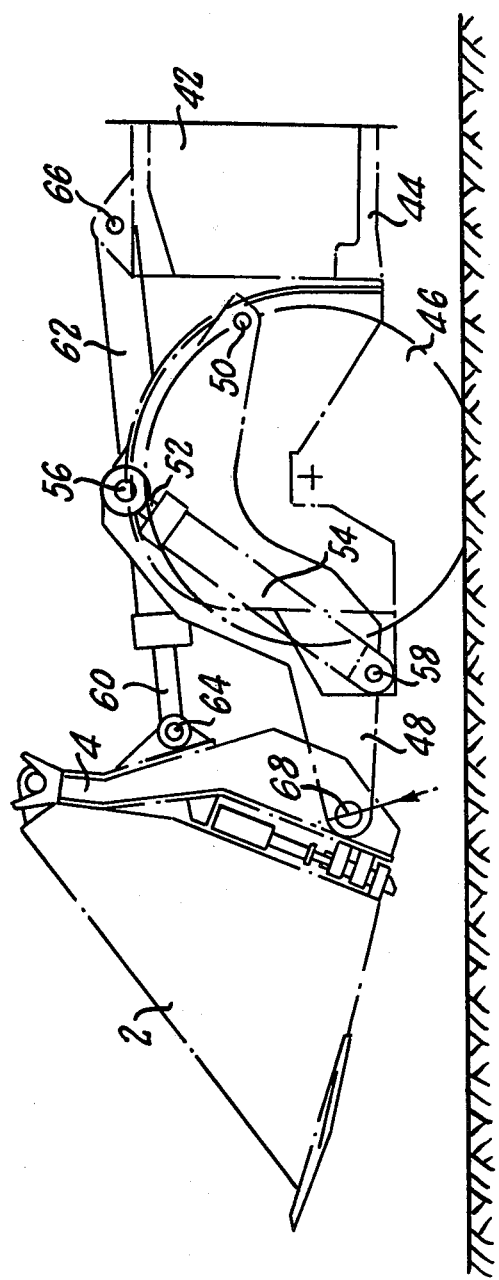

In operation, consider the situation illustrated in FIG. 3 in which the bucket 2 is resting on the ground, separate from the connecting assembly 4. The lifting cylinder 54 and the tilting cylinder 60 are operated to tilt the connecting assembly 4 forwardly and the service vehicle is advanced towards the bucket 2 until the lifting pins 12 enter the lifting forks 32. The connecting assembly 4 is then tilted slightly backwards, and the service vehicle is edged forwardly until the cylinder 36 and the guide bars 40 have entered the central recess 18. The cylinder 36 is then operated to advance the latch bar 34 to take up its latching position in the aperture 24. The long aperture face remote from the rear face 20 is inclined upwardly and outwardly to facilitate the entry of the latch bar 34 into the aperture 24. The connecting assembly 4 is now sitting in the profiled portion 10 with the plates 26 and 28 in mating contact with the faces 14 and 16. The bucket 2 is now securely connected to the connecting assembly 4 so as to prevent any relative movement of the bucket 2 and connecting assembly 4.

The vehicle is now ready to carry out any desired operation. For example, when the bucket 2 is picked up and locked against the connecting assembly 4, the bucket can then be advanced to a working area. When it is required to pick up fragmented coal, mineral or similar material for example, the bucket 2 is then tilted forward by operating the cylinder 62 so that the bucket's lower face skims the ground. The vehicle is then advanced to pick up the material, and the bucket 2 can be tilted alternatively backwards and forwards by operating the cylinder 62 to ensure that the material settles in the rear of the bucket thereby allowing the bucket to fill to its maximum capacity. When the bucket is filled the bucket is tilted rearwardly, and the vehicle is driven to a required dumping region. The bucket 2 is emptied when desired by advancing the piston 52 to raise arms 48, and advancing the piston 60 to tip the bucket 2 forwardly about the mountings 68. The bucket is then tilted so that its lower face is parallel to the ground and the bucket is then lowered until it rests on the ground. The cylinder 36 is then operated to withdraw the latch bar 34 from the aperture 24, the connecting assembly 4 is tilted forwardly slightly, and the vehicle is reversed to enable the connecting assembly 4 to withdraw from the deposited bucket 2. The vehicle is then ready to pick up another detachable unit.

It will be appreciated that the vehicle can pick up, operate and deposit any number of different detachable units quickly and simply. In addition, each detachable unit is securely connected to the connecting assembly 4, and will follow every movement of the connecting assembly 4 without any noticeable movement between the two.

In this described embodiment of the invention, the heavy duty service vehicle is used to carry and operate a heavy duty bucket 2. It is to be emphasised that the coupling system of the invention is not restricted for use with a bucket, and is particularly suitable for use in connection with material carrying, drilling, personnel carrying or any other reasonable duties associated with a vehicle used in underground or surface applications.

Figure 6:
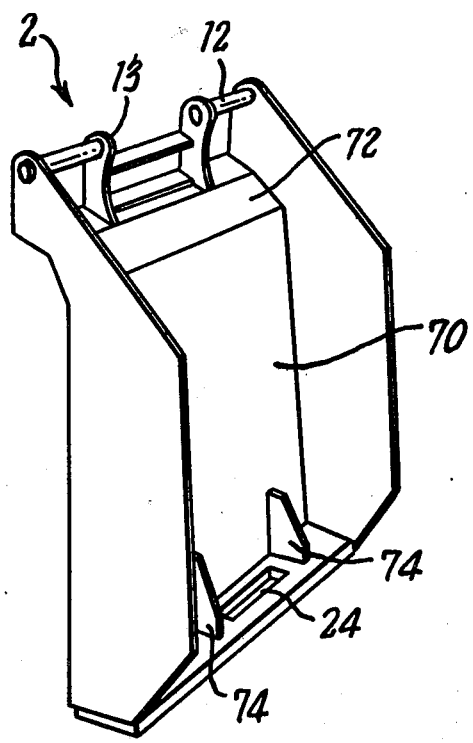

In addition, the coupling system of the invention is not restricted for use with the rear plate shown in FIG. 1. Alternative rear plates can be utilised to make units detachable, one such alternative is illustrated in FIG. 6, and corresponding parts are given corresponding reference numerals. The profiled portion 10 includes a major lower face 70, and a minor upper face 72. Two supporting plates 74 are located on opposite sides of the aperture 24 to provide added strength and rigidity when the latch bar 34 is inserted.

It is to be understood that the coupling system of the invention may differ in detail from the described embodiment which, as previously mentioned, constitutes an example of the invention. This coupling system may also be used with an electrically operable vehicle, and the bucket 2 may be used for picking up mineral. The two co-linear lifting pins 12 may be replaced by a single lifting pin, the transversely spaced lifting arms 48 may be replaced by a single arm, and each one of the pistons 52 and 60, and cylinders 54 and 62 may be replaced by a plurality of corresponding pistons and cylinders.

It will be appreciated that in the described embodiment the cylinders 36, 54 and 62 are remotely controlled so that all the herein described movements of the bucket 2 and connecting assembly 4 can be made without the operator having to leave his station.

When the latch bar 34 takes up its latching position in the aperture 24 it provides a downward force which retains the lifting pins 12 in the purpose made critically angled U-shaped lifting forks 32. As previously mentioned the long face of the aperture 24 remote from the rear face 20 is inclined upwardly and outwardly, and the latch bar 34 is wedge-shaped. This shaping of the aperture 24 and the latch bar 34 ensures that the latching movement of the latch bar 34 presses the bucket 2 against the connecting assembly 4 to ensure a rigid connection.

The shaping of the upwardly facing critically angled U-shaped lifting forks 32 and the dimensioning of the above described components enables the bucket 2 to be readily attached to and detached from the connecting assembly 4, and enables the bucket 2 to pivot throughout a range of movement and into engagement with the connecting assembly 4.

Another feature of the forks 32 is that when the latch bar 34 takes up its latching position to secure the lower part of the bucket 2, the shaping of the forks 32 ensures that the lifting pins 12 are locked in the forks 32 so that the bucket 2 is locked at both its upper and lower portions. The term "upwardly facing critically angled U-shaped forks" is intended to include a fork having these aforementioned features.

In the illustrated embodiment the latch bar 34 is described as being hydraulically operable in response to the cylinder 36. It is to be understood that this invention includes a coupling system in which the latch bar can be operated pneumatically, electrically, mechanically, or by any other suitable means.

Referring to FIG. 6, the dimensions of the faces 70 and 72 are related to the dimensions of the end plates 26 and 28 on the connecting assembly 4. The term "complementary" used in the claims is intended to include all the constructions disclosed in the specification.

Claim 1 refers to the latching means being automatically operable from a remote source. This distinguishes the invention from systems in which an operator has to leave his operating station to complete the process of attaching or detaching the operating device and support device.

I claim:

1. A coupling system for use with a service vehicle comprising:

a support device which is mounted upon the service vehicle and a readily separable operating device, said support and operating devices having complementary rear and forward portions, respectively, with said operating device having a central profiled portion to receive a complementary forward portion of said support device;

two transversely-spaced, upwardly-facing, outwardly divergently angled lifting forks fixed to the upper portion of said support device;

one or more transversely-disposed lifting pins mounted on the upper region of said operating device and positioned for location in said forks to enable said operating device to pivot about the axis of said lifting pins when elevated by said lifting forks to bring said complementary portions into engagement thereby inhibiting further relative movement of the two devices transverse to the axis of said lifting pins; and a latch bar mounted to said support device having a free end, and said operating device having a receiving member having an upwardly open aperture formed therein mounted within said central profiled portion, means operable from a remote source to selectively move said latch bar into a latching position at which said free end enters said aperture in said receiving member to draw said operating and support devices towards one another to take up a latching condition to retain said connected devices with said complementary portions in engagement, or a release condition to allow detachment of the devices.

2. A coupling system as claimed in claim 1, in which the complementary rear and forward portions each have two inclined faces meeting at a transverse line.

3. A coupling system as claimed in claim 2, in which the transverse line is located at the mid-region of the portion.

4. A coupling system according to claim 1 wherein said free end of said latch bar is wedge-shaped, and the face of said aperture in said receiving member is inclined upwardly and outwardly to receive said wedge-shaped end.

5. A coupling system as claimed in claim 4 in which the latch bar passes through a guide bar which is mounted on the support device and is adapted to sit on said end member when the operating device and support device are in engagement.

6. A coupling system as claimed in claim 5, in which a second guide bar is mounted on the support device above said firstmentioned guide bar.

7. A coupling system as claimed in claim 4 in which the latch bar is hydraulically operable.

8. A coupling system as claimed in claim 7, in which the latching means is operable from the vehicle.

* * * * *